Nov. 21, 1939.   E. W. REMBERT   2,180,695
PIPE COUPLING ASSEMBLY AND THE METHOD OF MAKING THE SAME
Filed Aug. 30, 1937
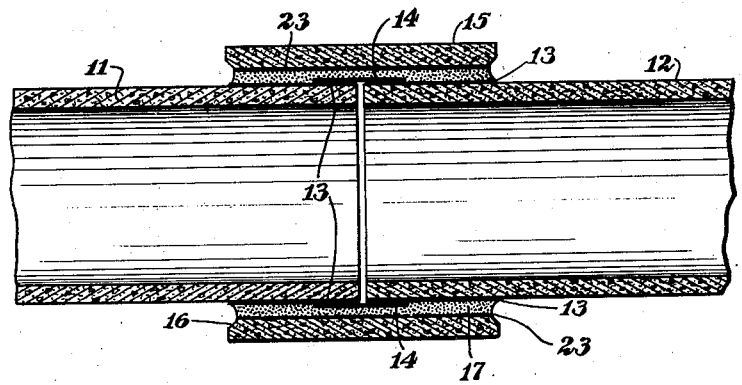
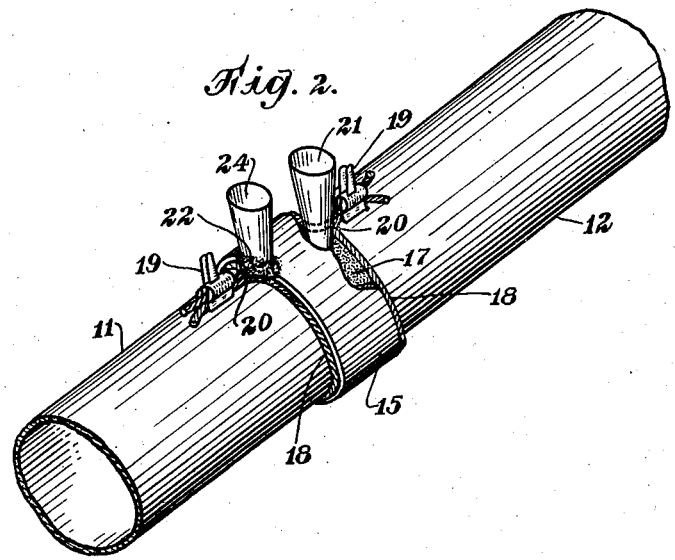
INVENTOR.
Ernest Wayne Rembert.
BY Virgil C. Kline
ATTORNEY.

Patented Nov. 21, 1939

2,180,695

UNITED STATES PATENT OFFICE 2,180,695

PIPE COUPLING ASSEMBLY AND THE METHOD OF MAKING THE SAME

Ernest Wayne Rembert, Plainfield, N. J., assignor to Johns-Manville Corporation, New York, N. Y., a corporation of New York Application August 30, 1937, Serial No. 161,576

4 Claims. (Cl. 285—114)

This invention relates to a pipe coupling assembly and the method of making the same.

The invention comprises two alined sections of pipe with their adjacent ends in close proximity to each other, an oversize sleeve extending over the adjacent end portions of the said sections, and a composition filling the space between the said portions and the sleeve. In the preferred embodiment, the filling composition is plastic to the extent of being at least appreciably yieldable, the adjacent ends of the pipe sections define a narrow space therebetween, and a tape-like element extends around the said adjacent ends and bridges the space therebetween.

The improved coupling of this invention may be used with various kinds of pipes, as, for instance, those of iron or steel, earthenware, or asbestos and Portland cement. The invention is particularly useful in connection with pipes that are not exactly true at their end portions and that require considerable expensive machining to make them so true that they may be used with conventional types of couplings. Also, pipes of somewhat different external diameters may be joined by means of the coupling.

The invention has been used with specially favorable results in connection with gravity-flow pipe lines in which the pipe is composed of an intimate mixture of asbestos and Portland cement, in the condition of having been shaped in wet form, under compression, and then hardened. Also, the coupling may be used in pipe lines operating at a pressure of forty pounds or so to the square inch.

The preferred embodiment of the invention is illustrated in the attached drawing.

Fig. 1 is a longitudinal sectional view of a pipe assembly constructed in accordance with the invention.

Fig. 2 is a perspective view, partly broken away for clearness of illustration, of the assembly as it is being made.

There are shown two juxtaposed sections 11 and 12 of pipe that may be of small or large size, say 3 inches to a foot or more in diameter. These sections are alined, that is, arranged in endwise relationship to each other. Adjacent ends of the two sections are in close proximity to each other and suitably defined therebetween a narrow space, say, one that may be one-sixteenth to one-half inch wide.

The adjacent end portions of the two sections of pipe are preferably precoated with an adhesive material 13 such as asphalt that penetrates the wall of the pipe to a sufficient extent to become footed therein and, on the other hand, is miscible with the filling composition later to be described. Likewise, the interior of the sleeve is precoated, as shown at 23, by an adhesive of properties stated in connection with element 13.

Extending around the end portions of the adjacent sections is the sheet element 14. This element spans the space between the adjacent pipe sections and serves as a dam for the joint filling composition 17, at the time of pouring, and, later, for liquid within the pipe. For best results, the element is adhered well to the ends of the pipe sections on both sides of the said space. A suitable width for the tape is 1.5 to 3 inches.

For this element 14 there may be used a strip of muslin, heavy canvas, duck, prepared roofing paper, electrical tape, or the like, the element suitably being precemented or impregnated by asphalt or the like and being softened by immersion in a solvent for the cement or impregnating material therein, say in gasoline or benzol, before being applied to the pipe sections. Cutback asphalt is a suitable adhesive for adhering the tape to the pipe ends. This adhesive, like the material 13, should be insoluble in the fluid to be conveyed by the pipe line and not brittle under normal conditions of use.

Disposed over the joint between the adjacent pipe sections is the rigid sleeve 15. This sleeve is oversize, that is, is larger in internal diameter than the external diameter of the sections of pipe 11 and 12 and of the ring of tape-like material 14. It may be cut from a section of larger pipe. Because of the sleeve being oversize, a space is defined between it and the tape element 14 and the sections 11 and 12. This space is approximately annular in cross section and may be of various dimensions. Thus, the space may be of width of a half-inch to an inch or slightly more and as long as the innermost part of the sleeve, say, three to ten inches or somewhat more.

As shown in the drawing the sleeve is imperforate, that is, without any opening except at the ends thereof.

Filling the annular space between the sleeve and the remainder of the assembly is the composition 17. This composition extends on both sides of the meeting zone or space between the pipe sections 11 and 12 and over the element 14.

The filling composition that I prefer is one consisting chiefly or exclusively of a relatively high melting asphalt. The asphalt may be filled, by being premixed with a large proportion of fine, inert material such as diatomaceous earth, slate dust, or very short asbestos fibers. In such a case, the proportion of filler should be adequate to decrease substantially the fluidity of the asphalt composition but below that which interferes seriously with the filling of the coupling at the high temperature of pouring. Other compositions that may be used are those including a large proportion of a relative stiff petroleum still residue, and/or high boiling plastic waxes and resins. For some purposes, there may be used, also, a lead composition or one including an intimate mixture of silica, clay, and sulphur, the sulphur being used in a proportion sufficient to render the composition slowly fluent at the temperature of the filling of the space inside the sleeve, as for instance, at about 300 to 400° F., the lead and sulphur giving non-flexible joints. A particular asphalt that is satisfactory is one known as asphalt jointing compound of softening point of at least 210° F., by the ring and ball method, and penetration at 77° F. of 20 to 30, by the standard penetration test. This particular asphalt is best poured into the joint at a temperature of 350 to 450° F.

During the pouring operation, means are employed to prevent the composition from escaping from the space which it is desired to fill and in which the composition is later to be hardened. Such means include elements in the annular space near each end thereof, as, for example, the runners 18, Fig. 2. These runners may be of any yieldable joint-closing material that may be packed in approximately fluid-tight manner between the ends of the sleeve and the pipe sections therewithin and that are not displaced by the filling composition at the temperature of pouring. Suitable runners are asbestos ropes of normal diameter slightly greater than the width of the annular space within the sleeve. These runners are drawn around the pipe sections and are tamped or forced into the space at the ends of the sleeve, the bevelled inner edges 16 of the sleeve facilitating the wedging in of the runners. Each joint runner 18 used in making the assembly is approximately uniform in diameter, is forced between an end of the sleeve and the pipe section therewithin, and serves to center roughly the sleeve and pipe section, say, to within about $\frac{1}{16}$ inch. The ends of each runner are suitably turned away from the sleeve, on the top of the pipe line, and held together in suitable manner, say, by pinch clamp 19. In this way there are left inlets or vents 20 which, at one end of the sleeve, may be used for the entrance of composition, through the pouring funnel 21, and, at the opposite end, as an outlet for air displaced by the filling composition and for holding funnel 24. A sufficient quantity of the composition is used so that at the end of the pouring operation, the composition rises in funnels 21 and 24, whereby, on cooling and contracting of the composition within the sleeve, additional amounts may be drawn from the funnels to fill the space within the sleeve.

The funnels may be luted in with clay 22 or other conventional luting composition.

In pouring the filling, the selected composition is first heated to a high temperature, to make it fluent and adherent to the primed surfaces, preferably to a temperature well above the flowing point, so that the composition may flow to the most remote parts of the space inside the sleeve. The composition is introduced through an inlet near one end of the sleeve, the displaced air being allowed to escape at the other end, as, for example, through the other vent described. The pouring is continued until enough of the composition has been supplied to displace practically all of the air in the space between the sleeve and the portions of the sections of pipe inside the runners 18, as shown by the composition appearing in the vent for the escaping air and rising an inch or so in the funnel. Pouring is then discontinued. After the filling composition has cooled, so that it no longer flows readily, the funnel and the runners are removed.

An assembly so made permits appreciable flexing of the pipe line without breaking of the joints, the filling composition yielding slowly to accommodate the flexing. For the most ready flexing, there is selected a relatively soft one of the filling compositions described.

The joint is tight against leakage in gravity flow systems. Also, it has been found by experiment to withstand pressures as high as 100 pounds to the square inch.

The system should be used only for conveying fluids that are non-solvents for the filling composition.

When flexibility of the coupling is not desired, the bituminous filling composition described may be replaced by a Portland cement composition such as a mortar, made fluent for pouring by the admixture of water and later hardened by hydration of the cement. Also, the lead or sulphur compositions, previously referred to, may be employed in such case.

The details given are for the purpose of illustration, not restriction, and variations within the spirit of the invention are intended to be included in the scope of the appended claims.

What I claim is:

1. In making a pipe assembly of the class described, the method which comprises arranging two sections of pipe end to end and in slightly spaced relationship to each other, closing the space between the ends of adjacent sections, placing over the thus formed joint a sleeve of internal diameter larger than the outside diameter of the said pipe sections, caulking the spaces between the opposite ends of the sleeve and the pipe sections with a temporary sealing means, drawing free ends of said means away from the ends of the sleeve at the top portion thereof, to form inlets, filling, with a fluent hardenable composition, the space between the sleeve and the ends of the pipe sections, through one of the said inlets, allowing air to escape from the other, and then hardening the said composition.

2. In making a pipe assembly of the class described, the method which comprises arranging two sections of pipe end to end and in slightly spaced relationship to each other, placing over the thus formed joint a sleeve of internal diameter larger than the outside diameter of the said pipe sections, forcing a rope-like element of approximately uniform diameter between each end of the sleeve and the pipe section therewithin, to center the sleeve and pipe section, filling, with a fluent hardenable composition, the space between the rope-like elements at opposite ends of the sleeve and thereafter removing the rope-like elements.

3. The method of making a pipe assembly which comprises juxtaposing two sections of pipe in endwise, spaced relationship to each other, applying a sheet member around the adjacent end portions of the sections so that it spans the space between them, placing a tubular sleeve, of internal diameter substantially larger than the external diameter of the pipe sections and applied member, around the said end portions and member, applying temporary sealing means in positions to substantially close the ends of the space defined by the sleeve, filling said space substantially closed by said sealing means and between the sleeve and the said end portions and member with a fluent hardenable composition, the filler composition being added at a position near one end of the said sleeve and the air replaced by the filler within the sleeve being allowed to escape at a position near the other end of the sleeve, hardening the composition, and thereafter removing said temporary sealing means.

4. The method of making a pipe assembly which comprises juxtaposing two sections of pipe in endwise, spaced relationship to each other, applying a sheet member around the adjacent end portions of the sections so that it spans the space between them, placing a tubular sleeve, of internal diameter substantially larger than the external diameter of the pipe sections and applied member, around the said end portions and member, applying temporary sealing means in positions to substantially close the ends of the space defined by the sleeve, filling said space substantially closed by said sealing means and between the sleeve and the said end portions and member with a fluent hardenable composition, adjacent end portions of the said sections being precoated with an adhesive material that is miscible with the filling composition, hardening the composition, and thereafter removing said temporary sealing means.

ERNEST WAYNE REMBERT.